Sept. 25, 1934.  G. AINSWORTH  1,974,556
BRAKE MECHANISM
Filed Nov. 9, 1931   3 Sheets-Sheet 1

INVENTOR.
GEORGE AINSWORTH
BY H. O. Clayton
ATTORNEY.

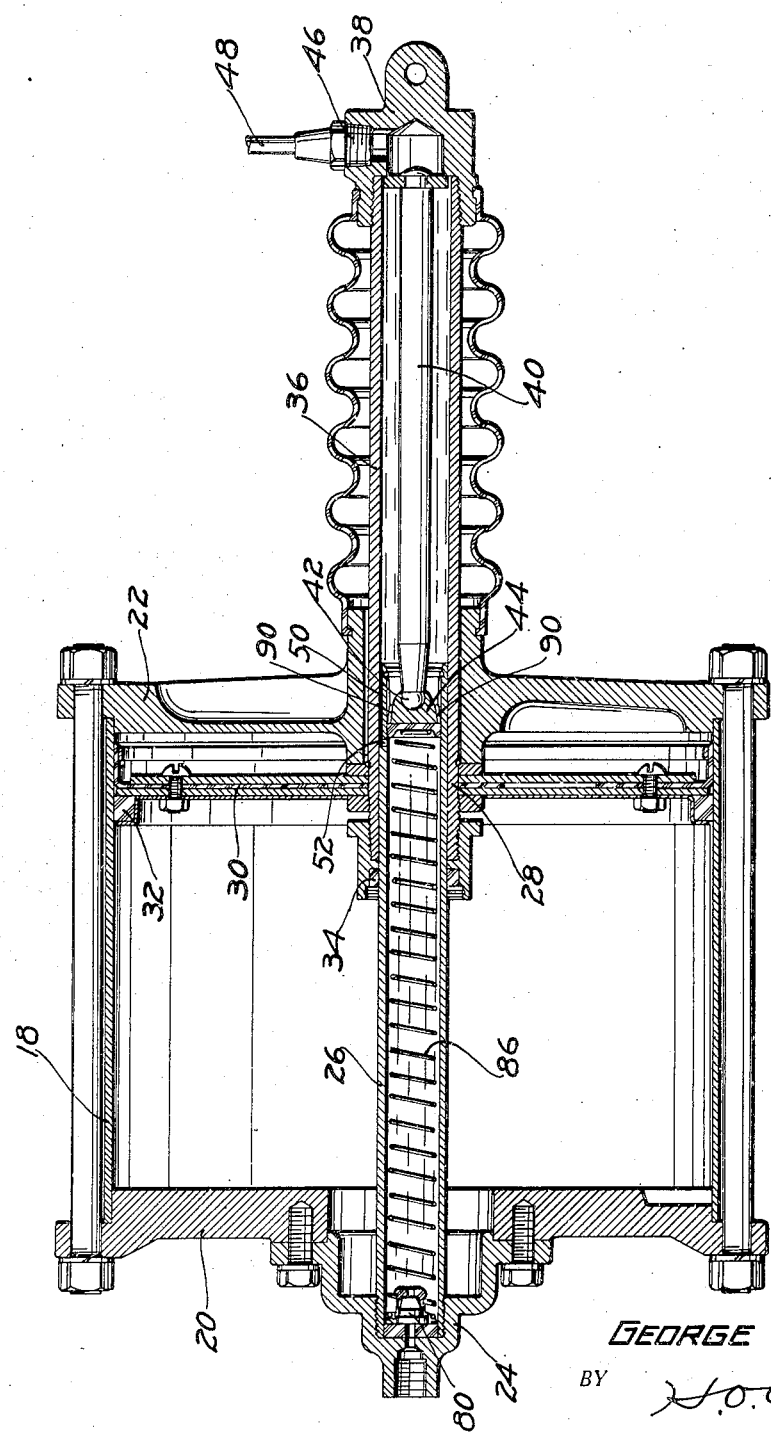

Sept. 25, 1934.                G. AINSWORTH                1,974,556
                              BRAKE MECHANISM
                         Filed Nov. 9, 1931          3 Sheets-Sheet 3

INVENTOR.
GEORGE AINSWORTH
BY
H.O.Clayton
ATTORNEY.

Patented Sept. 25, 1934

1,974,556

UNITED STATES PATENT OFFICE 1,974,556

BRAKE MECHANISM

George Ainsworth, Detroit, Mich., assignor to Bendix Aviation Corporation, South Bend, Ind., a corporation of Delaware Application November 9, 1931, Serial No. 573,896

12 Claims. (Cl. 60—54.6)

This invention relates to brakes, and particularly to power operated means for rendering operative a hydraulic braking system of the type now in vogue as applied to automotive vehicles.

The principal object of the invention resides in the utilization of a portion of the volume of a power operated fluid motor to permit the installation of a smaller fluid motor or master cylinder, the piston of the latter motor being actuated by the piston of the former.

A further object of the invention is to provide a combined unit of the aforementioned type wherein the piston rod of the prime mover fluid motor also functions as a partial reservoir for the oil or other fluid medium of the braking system.

Another object is to provide a compact unit of this character readily adapted, with but slight modification of structure, to use as a high pressure pump, or possibly as a clutch control medium, or in general as a means for operating any one of many speed controlling devices.

A further object of the invention lies in the provision of a combined vacuum or air operated power actuator or booster and a compensating type of hydraulic master cylinder, the latter being entirely housed by the former.

Yet another object is to provide a unit of the character described, the control valve of the booster part of the unit, together with the brake pedal and linkage interconnecting the pedal, valve and unit, being so constructed and so arranged that the operator may, at will, operate the unit solely by power or concurrently by power and physical effort, and in the event of the failure of operation of the booster may operate the master cylinder by physical effort alone.

Other objects of the invention and meritorious advantages thereof will become apparent from a reading of the detailed description of the invention in the specification to follow taken in conjunction with the accompanying drawings, in which:

Figure 2 is a longitudinal sectional view of the combined pressure differential operated booster motor and hydraulic master cylinder;

Figure 3:
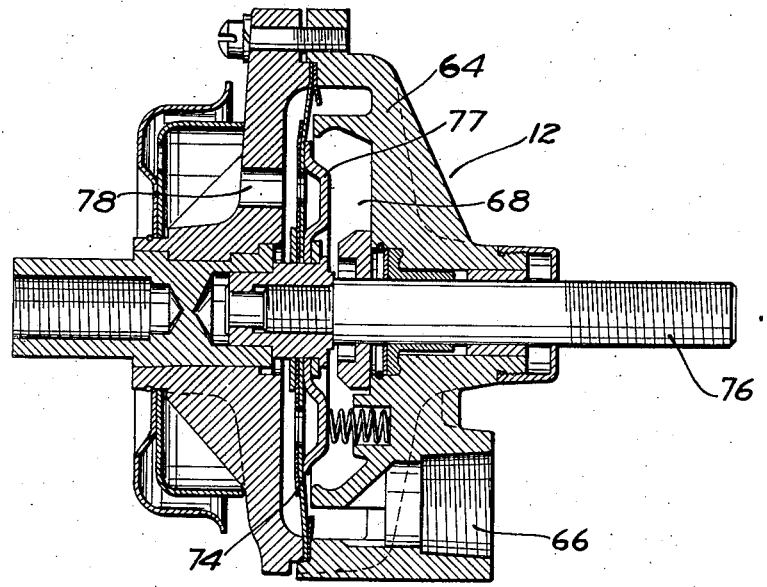

Figure 3 discloses, in section, the control valve for the booster motor; and

Figure 4:
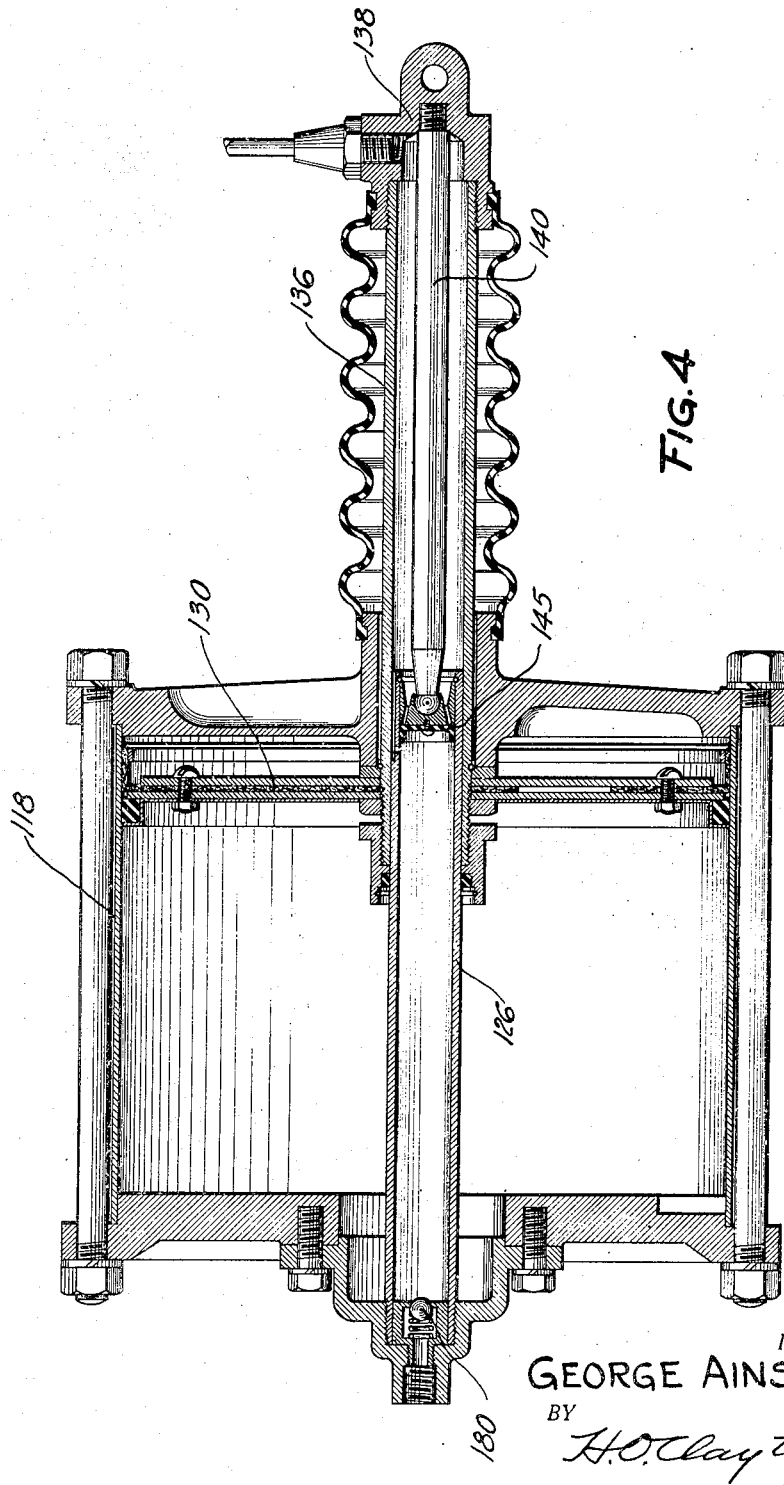

Figure 4 discloses, in fragmentary section, a modification of the construction of Figure 2 wherein the master cylinder unit is converted into a pump mechanism.

Figure 1:
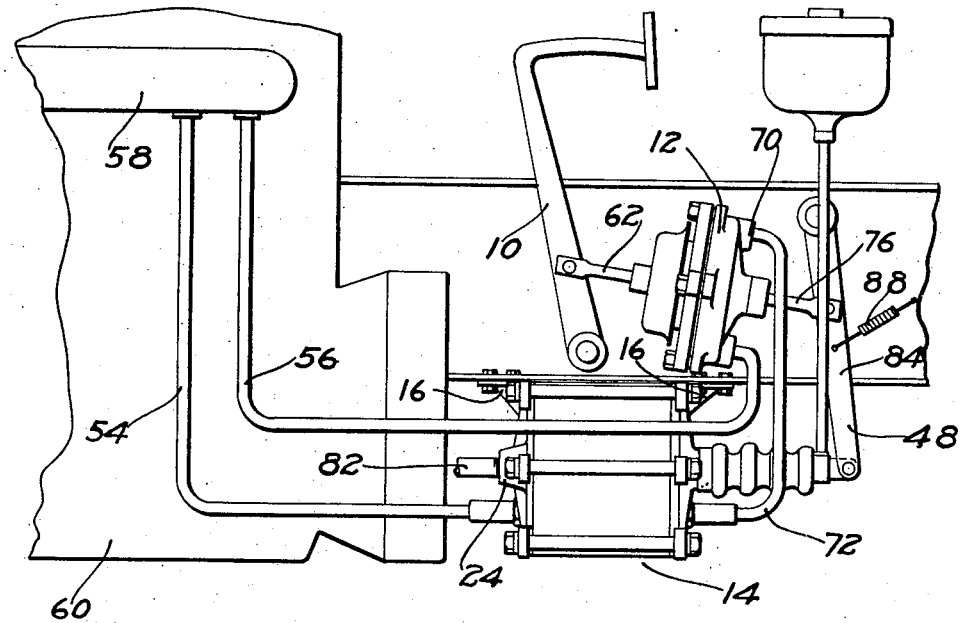
Figure 1 is a diagrammatic view, in side elevation, of the parts of the braking mechanism constituting the invention.

That embodiment of the invention disclosed somewhat diagrammatically in Figure 1 briefly comprises a conventional brake pedal 10 adapted to operate a three-way control valve 12, the latter serving to control the operation of a fluid power actuator or brake booster 14 secured to the chassis by brackets 16.

As will be more fully described hereinafter, the actuator functions to operate a hydraulic master cylinder, contained within the confines of the actuator, which master cylinder serves to force a suitable liquid under pressure into the several brake cylinders at the wheels of the vehicle to thereby apply the brakes.

Passing now to a more detailed description of the combined booster and master cylinder unit, there is disclosed in Figure 2 a cylinder body 18 closed by end plates 20 and 22. Plate 20 is provided with a central opening covered by a cap 24, internally threaded to receive a tube 26, constituting the master cylinder of a conventional hydraulic brake system. As a particular feature of the invention, the cylinder 26 also serves as a guide for the hub 28 of a piston 30 of a booster mechanism, the piston being, therefore, slidingly mounted for reciprocatory movement. Piston 30 is provided with the usual packing and ring structure at 32 and also with a gland 34 to obviate leakage.

The booster piston is provided with a hollow rod 36 threaded at its end to receive an end cap 38, the latter functioning as a thrust block for a piston rod 40 of the master cylinder, the rod being connected, by a ball and socket joint 42, with a piston 44. The ball and socket universal connection at 42 is provided to compensate for possible misalignment between the rod 40 and cylinder 26.

The cylinder 26 and hollowed rod 36 are both normally filled with a force transmitting fluid, such as castor oil cut with alcohol, the end cap 38 being tapped at 46 to receive a flexible hose 48 leading to a suitable supply tank. Cylinder 26 at its inner end is provided with a groove 50 interconnecting a port 52 and the rod 36 when the piston 44 is retracted to its brake off position, as disclosed in Figure 2.

The actuator or booster mechanism is preferably vacuum operated in a manner well-known in the art, operation of the manually operated valve 12 serving to create pressure differentials acting upon the piston 30 to energize the actuator. As disclosed, the actuator is connected on opposite sides of its piston, and by means of conduits 54 and 56, with the intake manifold 58 of the engine 60, the aforementioned control valve being interposed in one of said connections. Such a construction constitutes the suspended-in-vacuum type of actuator, inasmuch as the actuator cylinder is evacuated, when in brake off position, by virtue of the pumping action of the engine cylinders at closed throttle.

In operation, actuation of the pedal 10 serves, through the intermediary of link 62, to move the two connected parts of the casing 64 of the valve. In the brake off position of the valve parts disclosed in Figure 3, the valve intercommunicates the manifold 58 and right compartment of the actuator by virtue of the circuit comprising conduit 56, port 66, valve chamber 68, port 70, Figure 1, and a conduit 72. The left compartment of the actuator is in uninterrupted communication with the manifold via conduit 54. With the aforementioned movement of the valve casing, however, the casing contacts a diaphragm member 74 positively connected to link 76, thereby closing off the communication with the manifold. Subsequent movement of the pedal and positively connected valve casing serves to move the diaphragm 74 away from a stop member 77 secured to the link 76 to thereby vent the right side of the actuator to atmosphere via atmospheric openings 78, port 70 and conduit 72.

The differentials of pressure thus set up result in movement of the piston 30 to the left. The rod 40 is accordingly placed under compression to move the master cylinder piston 44 to the left, Figure 2, and force the brake applying pressure fluid into the lines via outlet valve 80 and conduit 82.

Should the movement of the pedal 10 be stopped intermediate its throw, the continued movement of the piston 30 serves, through the intermediary of the rod 36, a connected idler lever 84 and link 76, to lap the valve and hold the brakes applied; by this is meant that the stop 77 moves to contact the diaphragm 74, cutting off the atmospheric connection without, however, effecting the connection with the vacuum source.

With the disclosed arrangement it will also be noted that in case of failure of the booster to function the master cylinder may be energized exclusively by the physical effort of the operator through the medium of the linkage just described. It will also be noted that there may be a concurrent physical and power application of the master cylinder with the aforementioned mechanism.

Upon release of the pedal the right-hand compartment of the actuator is again placed in communication with the manifold to thereby establish an equilibrium of forces upon the piston 30 and make possible a return of the piston 44 and cooperating parts of the aforementioned structure to their brake off or inoperative position. The piston 44 is returned by a spring 86 and the piston 30 by a spring 88. By virtue of the disconnected engagement between the cap 38 and rod 40 the piston 44 may return to its inoperative position independently of the rate of release of the prime mover piston 30, thus obviating the possibility of creating a vacuum in the hydraulic system. Openings 90 are provided in the piston 44 to permit ingress of liquid into the master cylinder 26 before the piston 44 uncovers the port 52, should such a vacuum be created.

There is thus provided a very compact and effective unit in a brake system combining the attributes of the well-known hydraulic brake with those of the well-known booster or servo motor. The suggested structure insures an effective operation of the hydraulic master cylinder in that a constant volume of working fluid is maintained in the system; the particular structure likewise insures an effective operation of the prime mover booster or power mechanism, there being no interference to the operation of the latter by virtue of the presence of the master cylinder within the booster.

It is also suggested that the master cylinder may function purely as a pump by means of a construction such as disclosed in Figure 4 wherein a booster cylinder 118 is provided with a reciprocable piston 130, the latter serving to operate a connecting rod construction comprising a rod 136, a cap 138 and a plunger 140 rigidly secured to said cap. A tube 126, housed within the hub portion of the piston 130 and the end wall of the booster cylinder 118, serves as the cylinder member of the pump, the piston element of the pump comprising a cap 145 secured to the end of the rod 140. A one-way check valve 180 completes the pump construction, the same being rendered operative either by the booster piston 130 or manually with operation of the rod 136 by the brake pedal.

While one illustrative embodiment has been described, it is not my intention to limit the scope of the invention to that particular embodiment, or otherwise than by the terms of the appended claims.

I claim:

1. In a force transmitting apparatus, a fluid motor comprising a cylinder and a piston in said cylinder formed with a central opening; a tubular rod secured to said piston and extending through said opening; a fluid pump operated by said fluid motor comprising a cylinder of relatively small diameter positioned within said first mentioned cylinder and extending through said piston into said tubular rod in sliding contact therewith and a piston in said relatively small cylinder; and a connection between said tubular rod and said piston, whereby said tubular rod aids in supporting said relatively small cylinder and serves as a guide therefor.

2. A power transmitting apparatus comprising a fluid motor having a motor cylinder and a motor piston formed with a central opening; a fluid pump operated by said fluid motor and comprising a pump cylinder of relatively small diameter having one end secured to one end of said motor cylinder, and having the other end extending through the opening in the motor piston, and a pump piston in said pump cylinder; a tubular rod formed with a boss connected to said motor piston, and surrounding a portion of said pump cylinder; a piston rod connecting said tubular rod and said pump piston; a manually operated member; a valve for controlling said fluid motor; and means for connecting said manually operated member to said valve and to said boss on said tubular rod.

3. In a power transmitting apparatus, a fluid motor comprising a cylinder provided with a front head and a rear head, and a piston in said cylinder formed with a central opening; a fluid pump comprising a pump cylinder of relatively small diameter having one end secured to the front end of said motor cylinder and having the other end extending through said opening in the motor piston, and a pump piston in said pump cylinder formed with a spherical socket; a tubular rod connected to said motor piston and surrounding a portion of said pump cylinder and extending rearwardly from said motor piston through the rear head of the motor cylinder; and a piston rod within said tubular rod, having its rear end connected to the tubular rod adjacent to the rear end of the tubular rod, and having at its forward end a ball shaped portion seated in said spherical socket, whereby discrepancies in alignment are compensated for.

4. In a force transmitting apparatus, a fluid motor comprising a motor cylinder provided with a front head and a rear head, and a motor piston therein formed with a central opening; a fluid pump comprising a relatively small pump cylinder positioned in said motor cylinder and having an outlet extending through the front head of said motor cylinder and formed adjacent to its rear end with an orifice extending through a wall of the cylinder and with a groove on the exterior of the cylinder connecting said orifice with the rear end of the cylinder, and a piston positioned in said pump cylinder for sliding movement therein and arranged in its normal inactive position just rearwardly of said orifice; a tubular rod surrounding the rearward portion of said pump cylinder, secured to said motor piston and extending rearwardly therefrom; a piston rod connected to said pump piston and to said tubular rod and positioned within said tubular rod; and means for supplying fluid to said tubular rod comprising a reservoir and a conduit connected thereto, whereby fluid may flow between said reservoir and said pump cylinder in either direction whenever said pump piston is in its normal inactive position by way of said conduit, said tubular rod, said groove, and said orifice.

5. In a brake apparatus for operating the brakes of an automotive vehicle, a pressure differential operated fluid motor comprising a cylinder and a reciprocable piston therein, a hollow rod secured to said piston, a plunger member housed within said rod, and a brake operating master cylinder unit housed within the confines of said first mentioned cylinder, piston and rod, said master cylinder unit comprising a tubular member sleeved within the hub of the aforementioned piston, and further comprising a piston element contacting said plunger member, said tubular member being constructed at one of its ends to provide fluid transmitting communication between the interior of said tubular member and said aforementioned hollow rod when the piston element of the master cylinder unit is in its brake off position.

6. In a force transmitting apparatus, a fluid motor comprising a cylinder, and a piston therein; a fluid pump comprising a cylinder extending through said motor cylinder and said motor piston, a pump piston slidably mounted in said cylinder, a spring in said pump cylinder bearing on said piston; a tubular rod secured to said motor piston and extending rearwardly therefrom; a piston rod secured to said pump piston and having a one-way connection with said tubular rod whereby movement of said motor piston in one direction is effective to move said pump piston in the same direction, but movement of the pump piston in the opposite direction is dependent solely upon the force of said spring.

7. Brake operating mechanism comprising a pressure differential operated motor including cylinder and piston elements, a hollow rod secured to said piston element and projecting laterally from said motor, a control valve for said motor, valve operating means, and a master cylinder unit housed within the confines of said motor parts and rod, said unit comprising a tubular casing member and a piston member, and means, housed within said rod and interconnecting said last mentioned piston element and said valve operating means.

8. Brake operating mechanism comprising a suspended-in-vacuum pressure differential operated motor comprising a double-ended cylinder member, a reciprocable piston element within said cylinder member, a hollow connecting rod member secured to the hub of said piston and projecting laterally from the aforementioned cylinder member through one end wall thereof, a plunger member housed within and secured to said rod member, and a brake operating master cylinder unit housed within the confines of said motor elements in said hollow rod, said unit comprising a hollow power fluid retaining member sleeved within the hub of the aforementioned piston element, and further comprising a reciprocable piston member operably connected to said plunger member.

9. In a fluid transmission apparatus, a fluid motor comprising a motor cylinder having a forward end, and a motor piston formed with a central opening; a fluid pump comprising a pump cylinder extending through said motor cylinder and said motor piston, having an outlet at its forward end and at the forward end of said motor cylinder, and formed with an orifice extending through a wall adjacent to but spaced from its rearward end and with a groove on the exterior of the cylinder extending from the rearward end to said orifice, and a pump piston arranged for sliding movement in said pump cylinder and normally positioned just rearward of said orifice; and a tubular rod surrounding the rearward end of said pump cylinder, secured to said motor piston and extending rearwardly therefrom and connected by means of a rod positioned in said tubular rod to said pump piston.

10. In a braking apparatus, a pressure differential operated motor comprising a double-ended cylinder, a reciprocable piston within said cylinder, a fluid receiving hollow connecting rod secured to said piston and movable therewith, said rod projecting through and beyond one end wall of said cylinder, together with a master cylinder mechanism housed within the confines of said motor and comprising a fluid receiving cylinder supported at one end by one end wall of said motor and at its other end by said connecting rod, and further comprising a piston member reciprocable within said cylinder, and means housed within said connecting rod for actuating said master cylinder piston.

11. In a braking apparatus, a pressure differential operated motor comprising a double-ended cylinder, a reciprocable piston within said cylinder, a fluid receiving hollow connecting rod secured to said piston and movable therewith, said rod projecting through and beyond one end wall of said cylinder, together with a master cylinder mechanism housed within the confines of said motor and comprising a cylinder member sleeved within said hollow connecting rod, and further comprising a piston member, and a plunger secured to one end of said connecting rod and contacting said master cylinder piston to actuate the same with a brake applying operation of said pressure differential motor.

12. In a braking apparatus of the class described, a fluid motor comprising a cylinder, a reciprocable piston within said cylinder, said piston being provided with an orificed hub portion, a hollow fluid receiving rod connected to and extending from said piston hub portion, and a master cylinder assembly housed within the confines of said cylinder, piston and rod, said assembly comprising a tubular fluid receiving member sleeved within said rod member, a reciprocable piston member slidable within said tubular member and operably connected with said rod member, said tubular member being constructed at its end adjacent said piston member to provide a fluid by-pass interconnecting said hollow rod member and tubular member when said master cylinder piston is in its brake off position.

GEORGE AINSWORTH.